US007548519B2

(12) United States Patent
Motegi et al.

(10) Patent No.: US 7,548,519 B2
(45) Date of Patent: Jun. 16, 2009

(54) MOBILE COMMUNICATION SYSTEM, MOBILE COMMUNICATION METHOD, MOBILE TERMINAL AND BASE STATION

(75) Inventors: Masayuki Motegi, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1524 days.

(21) Appl. No.: 10/314,240

(22) Filed: Dec. 9, 2002

(65) Prior Publication Data

US 2003/0117968 A1 Jun. 26, 2003

(30) Foreign Application Priority Data

Dec. 10, 2001 (JP) ............................. P2001-376414

(51) Int. Cl.
*H04B 7/185* (2006.01)
(52) U.S. Cl. .................. 370/318; 370/311; 370/338; 370/389; 455/13.4; 455/343.1; 455/574; 455/522
(58) Field of Classification Search ................. 370/318, 370/338, 389, 311; 455/343.1, 343.5, 13.4, 455/522
See application file for complete search history.

(56) References Cited

U.S. PATENT DOCUMENTS

| | | | | |
|---|---|---|---|---|
| 5,752,201 A | * | 5/1998 | Kivari | 455/574 |
| 5,842,141 A | * | 11/1998 | Vaihoja et al. | 455/574 |
| 5,845,204 A | * | 12/1998 | Chapman et al. | 455/343.1 |
| 5,881,055 A | * | 3/1999 | Kondo | 370/311 |
| 6,212,175 B1 | * | 4/2001 | Harsch | 370/338 |
| 6,473,607 B1 | * | 10/2002 | Shohara et al. | 455/343.1 |
| 6,725,067 B1 | * | 4/2004 | Marx et al. | 455/574 |
| 6,799,030 B2 | * | 9/2004 | Barber et al. | 455/343.1 |
| 6,826,165 B1 | * | 11/2004 | Meier et al. | 370/338 |
| 6,889,055 B1 | * | 5/2005 | Neufeld | 455/458 |
| 7,088,698 B1 | * | 8/2006 | Harsch | 370/338 |
| 7,126,945 B2 | * | 10/2006 | Beach | 370/389 |
| 7,277,737 B1 | * | 10/2007 | Vollmer et al. | 455/574 |
| 7,403,507 B2 | * | 7/2008 | McDonough et al. | 370/335 |

FOREIGN PATENT DOCUMENTS

| | | |
|---|---|---|
| JP | 4-302230 | 10/1992 |
| JP | 5-183487 | 7/1993 |
| JP | 9-83427 | 3/1997 |
| JP | 11-313370 | 11/1999 |

* cited by examiner

*Primary Examiner*—Marceau Milord
(74) *Attorney, Agent, or Firm*—Oblon, Spivak, McClelland, Maier & Neustadt, P.C.

(57) ABSTRACT

In a mobile communication system for carrying out packet transmission/reception between a mobile terminal having a power saving mode to reduce a power consumption and a radio base station, a packet type of a packet is judged, and a sleep timer value indicating a time duration since a last packet is transmitted/received until the power saving mode starts is set according to a judgement result. Then, at least one sleep timer for measuring an elapsed time since the packet is transmitted/received is activated, and the mobile terminal is controlled to execute the power saving mode at a timing at which the elapsed time measured by the at least one sleep timer exceeded the sleep timer value.

16 Claims, 6 Drawing Sheets

REALTIME

NON-REALTIME

REALTIME

INTERMITTENT RECEIVING PERIOD

NON-REALTIME

INTERMITTENT RECEIVING PERIOD

MOBILE COMMUNICATION SYSTEM, MOBILE COMMUNICATION METHOD, MOBILE TERMINAL AND BASE STATION

BACKGROUND OF THE INVENTION

1. Field of the Invention

The present invention relates to a method for saving power in a mobile communication system, and more particularly, to a technique for a power saving mode transition on a mobile terminal in radio packet communications.

2. Description of the Related Art

Conventionally, the mobile communication system such as PHS or HIPERLAN Type 2 (High Performance Radio Local Area Network) is provided with a power saving mode function for reducing a battery consumption of a mobile terminal.

For example, the cellular system such as PHS is a communication system of circuit switching type in which the end of communication is clear so that, after the communication is terminated, the mobile terminal makes a transition to a power saving mode for intermittently receiving signals from radio base stations. There is only one period for the intermittent receiving in this power saving mode called super-frame period (see ARIB RCR STD-28 second generation cordless telephone system standard specification).

Also, in the HIPERLAN Type 2, a transition to the power saving mode for intermittently receiving signals from access points (AP) is made in the case of power saving. In this power saving mode, at most sixteen types of the intermittent receiving period can be selected, with the maximum value of the intermittent receiving period being given by a time span of the broadcast frame at which all the terminals (mobile terminals) receive signals from the AP. These sixteen types of the power saving mode are provided in order to prevent the concentration of mobile terminals to one power saving mode, so that a negotiation between the AP and the mobile terminal is carried out to determine one intermittent receiving period from the sixteen types at a time of transition to the power saving mode, and the intermittent receiving is carried out by using one and only one determined intermittent receiving period during the power saving mode such that the intermittent receiving period is not changed dynamically (see, ETSI TS 101 761-2 V1.1.1 ETSI BRAN HIPERLAN Type 2 Technical Specification).

However, in the conventional art described above, during the power saving mode, the mobile terminal intermittently receives signals from the radio base stations or APs and recovers the communication state when the signals are received, so that in the case of making a transition to the communication state, a delay that is at most as much as the intermittent receiving period occurs since the signals are sent from the radio base station (AP) until the communication state is recovered. For this reason, when a transition to the power saving mode is made during the realtime communications, a paging delay occurs and the packet receiving is not carried out normally so that there is a possibility for the quality degradation due to the packet loss.

In particular, in the cellular system described above, only one intermittent receiving period during the power saving mode is set up so that the intermittent receiving period must be reduced in accordance with the realtime communications when the realtime and non-realtime packets coexist, but the reduction of the paging delay requires the corresponding reduction of the intermittent receiving period so that there has been a problem that the sufficient effect cannot be obtained from a viewpoint of the power saving.

On the other hand, in the HIPERLAN Type 2 described above, a plurality of intermittent receiving periods during the power saving mode exist, but a value selected at a time of the transition to the power saving mode is continually used as the intermittent receiving period of the mobile terminal so that it is impossible to cope with the change of the communication state and there has been a problem that the sufficient power saving effect cannot be realized.

BRIEF SUMMARY OF THE INVENTION

It is therefore an object of the present invention to provide a mobile communication system, a mobile communication method, a mobile terminal and a base station capable of realizing an effective power saving mode while reducing a response delay by adjusting an intermittent receiving period during the power saving mode and a timing for making a transition to the power saving mode according to a packet communication format in the mobile communication system.

According to one aspect of the present invention there is provided a mobile communication system for carrying out packet transmission/reception between a mobile terminal and a radio base station, comprising: a power saving unit for executing a power saving mode to reduce a power consumption at the mobile terminal; a packet classification judgement unit for judging a packet type of a packet; a sleep timer setting unit for setting a sleep timer value indicating a time duration since a last packet is transmitted/received until the power saving mode starts, according to a judgement result of the packet classification judgement unit; at least one sleep timer for measuring an elapsed time since the packet is transmitted/received; and a sleep execution unit for activating the sleep timer after the packet is transmitted/received, and controlling the power saving unit to execute the power saving mode at a timing at which the elapsed time measured by the at least one sleep timer exceeded the sleep timer value.

According to another aspect of the present invention there is provided a mobile communication method for carrying out packet transmission/reception between a mobile terminal having a power saving mode to reduce a power consumption and a radio base station, comprising the steps of: (a) judging a packet type of a packet; (b) setting a sleep timer value indicating a time duration since a last packet is transmitted/received until the power saving mode starts, according to a judgement result of the step (a); (c) activating at least one sleep timer for measuring an elapsed time since the packet is transmitted/received; and (d) controlling the mobile terminal to execute the power saving mode at a timing at which the elapsed time measured by the at least one sleep timer exceeded the sleep timer value.

According to another aspect of the present invention there is provided a mobile terminal device for carrying out packet transmission/reception with a radio base station, comprising: a power saving unit for executing a power saving mode to reduce a power consumption at the mobile terminal device; a packet classification judgement unit for judging a packet type of a packet; a sleep timer setting unit for setting a sleep timer value indicating a time duration since a last packet is transmitted/received until the power saving mode starts, according to a judgement result of the packet classification judgement unit; at least one sleep timer for measuring an elapsed time since the packet is transmitted/received; and a sleep execution unit for activating the sleep timer after the packet is transmitted/received, and controlling the power saving unit to execute the power saving mode at a timing at which the elapsed time measured by the at least one sleep timer exceeded the sleep timer value.

According to another aspect of the present invention there is provided a radio base station device for carrying out packet transmission/reception with a mobile terminal having a power saving mode to reduce a power consumption, comprising: a packet classification judgement unit for judging a packet type of a packet; a sleep timer setting unit for setting a sleep timer value indicating a time duration since a last packet is transmitted/received until the power saving mode starts, according to a judgement result of the packet classification judgement unit; at least one sleep timer for measuring an elapsed time since the packet is transmitted/received; and a sleep permission signal transmission unit for activating the sleep timer after the packet is transmitted/received, and transmitting a sleep permission signal for controlling the mobile terminal to execute the power saving mode at a timing at which the elapsed time measured by the at least one sleep timer exceeded the sleep timer value.

Other features and advantages of the present invention will become apparent from the following description taken in conjunction with the accompanying drawings.

DETAILED DESCRIPTION OF THE INVENTION

First Embodiment

Referring now to FIG. 1 to FIG. 6, the first embodiment of a mobile communication system according to the present invention will be described in detail.

(Configuration of a Mobile Communication System)

Figure 1:
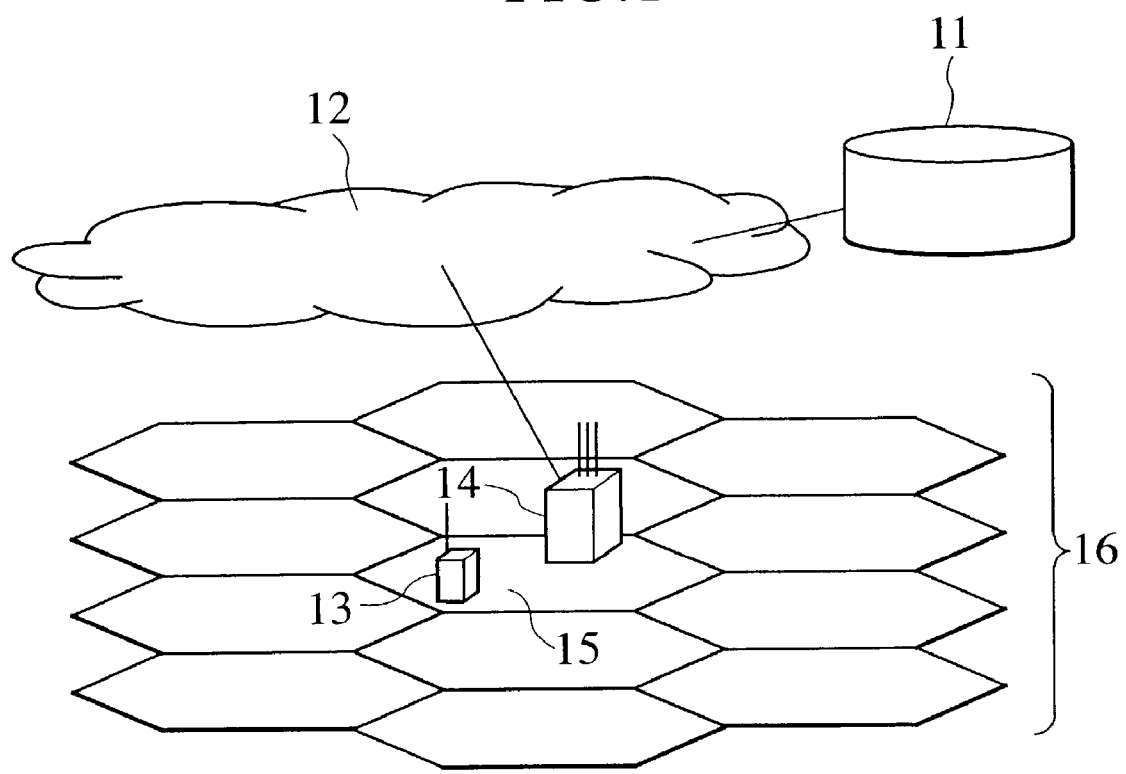
FIG. 1 is a diagram showing a basic configuration of a mobile communication system according to the present invention.

FIG. 1 schematically shows a basic configuration of the mobile communication system according to the first embodiment, which is also applicable to the second embodiment to be described below.

As shown in FIG. 1, the mobile communication system according to this embodiment has a communication network 12 formed by interconnecting communication channels, a mobile terminal 13 to be used by a user and connected to the communication network 12, a radio base station 14 for carrying out packet communications with the mobile terminal 13, and a location information management server 11 connected with the communication network 12, for managing a location information of the mobile terminal 13.

Each mobile terminal 13 is located within a cell 15 formed by the radio base station 14, and carries out a location registration of the own device on a location registration area 16 formed by a set of the radio zones 15. This location information is managed by the location information management server 11.

Each mobile terminal 13 has a function for making a transition to a power saving mode for intermittently receiving control signals from the radio base station 14 periodically if there is no packet transmission/reception with respect to the radio base station 14 for a prescribed period of time even during the communications.

Figure 2:
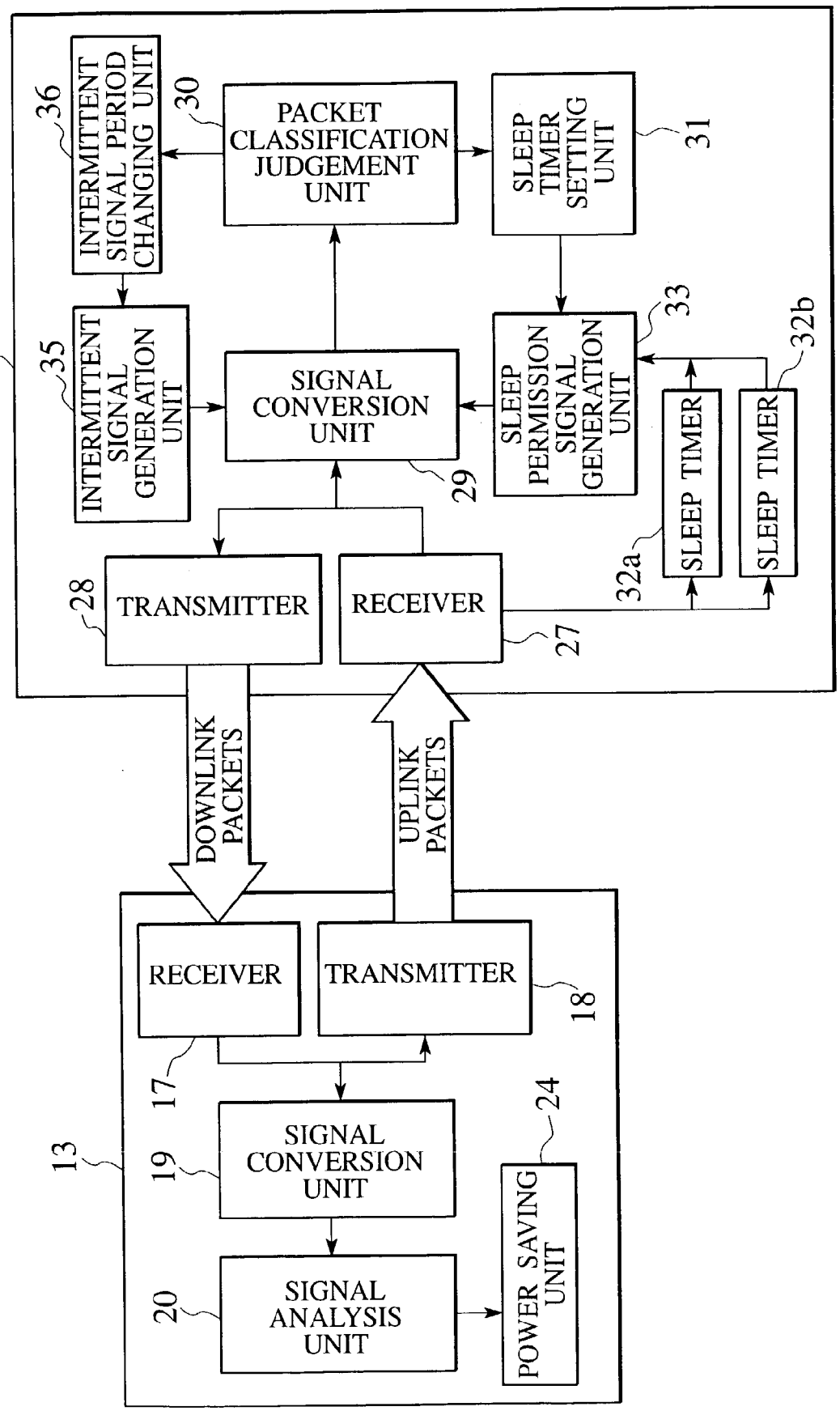
FIG. 2 is a block diagram showing an internal configuration of a mobile terminal and a radio base station in the mobile communication system according to the first embodiment of the present invention.

FIG. 2 shows an internal configuration of the mobile terminal 13 and the radio base station 14 according to this embodiment. As shown in FIG. 2, the mobile terminal 13 has a receiver 17 and a transmitter 18 for receiving/transmitting signals such as packets with respect to the radio base station 14, a signal conversion unit 19 for carrying out processing such as encoding, decoding, etc., with respect to the packets to be transmitted/received, a signal analysis unit 20 for analyzing contents of the received signals, and a power saving unit 24 for executing the power saving mode.

The signal analysis unit 20 receives signals converted by the signal conversion unit 19, extracts a sleep permission signal from the received signals, and controls the power saving unit 24 to execute the power saving mode according to the sleep permission signal.

The power saving unit 24 executes the power saving mode for reducing the power consumption at the mobile terminal 13, and more specifically, the power saving unit 24 turns off a back light of a monitor of the mobile terminal 13 or carries out the intermittent receiving to be described below.

On the other hand, as shown in FIG. 2, the radio base station 14 has a receiver 27, a transmitter 28, a signal conversion unit 29, a packet classification judgement unit 30, a sleep timer setting unit 31, sleep timers 32$a$ and 32$b$, a sleep permission signal generation unit 33, an intermittent signal generation unit 35 and an intermittent signal period changing unit 36.

The transmitter 28 and the receiver 27 carry out transmission/reception of packet data and control signals with respect to the mobile terminal 13, and the signals to be transmitted/received are converted by the signal conversion unit 29.

The packet classification judgement unit 30 is a circuit for judging a priority level of the packet entered from the signal conversion unit 29 and a packet type that indicates whether this packet is of a realtime format or of a non-realtime format, etc. More specifically, the packet classification judgement unit 30 analyzes an identifier for identifying the packet type that is described in a packet, and according to this identifier, judges the priority level of the packet and that the radio base station 14 or the mobile terminal 13 is carrying out the realtime communication. This judgement result is sent to the intermittent signal period changing unit 36 and the sleep timer setting unit 31.

The sleep timer setting unit 31 is a circuit for setting a sleep timer value that indicates a time duration since the last packet is transmitted/received until the power saving mode starts, according to the judgement result by the packet classification judgement unit 30. More specifically, the sleep timer setting unit 31 receives the judgement result from the packet classification judgement unit 30, and according to the packet type that indicates whether it is the realtime communication or the non-realtime communication, etc., the sleep timer setting unit 31 inputs a value selected from a plurality of sleep timer values stored in an internal memory into the sleep permission signal generation unit 33.

The sleep timers 32a and 32b are timers for measuring an elapsed time since the packet is transmitted/received, where the receiver 28 that detected the receiving of the packet activates the timer and the elapsed time is inputted into the sleep permission signal generation unit 33.

Note that, while measuring the elapsed time, when another packet of a type different from the type of the packet related to the measurement is received, another one of the sleep timers 32a and 32b is activated in order to carry out the measurement for the packet of a different type. More specifically, the sleep timer 32a is activated when the packet of the realtime communication is received, whereas the sleep timer 32b is activated when the packet of the non-realtime communication is received.

The sleep permission signal generation unit 33 activates the sleep timer 32 after the packet is transmitted/received, and generates the sleep permission signal for controlling the mobile terminal 13 to execute the power saving mode at a timing where the measured time by the sleep timer 32 exceeds the sleep timer value. The generated sleep permission signal is transmitted to the mobile terminal 13 through the signal conversion unit 29 and the transmitter 27. Note that, when a plurality of the sleep timers are being activated, the sleep permission signal generation unit 33 generates and transmits the sleep permission signal after all the sleep timers are expired.

The intermittent signal generation unit 35 is a circuit for periodically transmitting/receiving the control signals with respect to the mobile terminal 13 in the power saving mode, where the period for transmission is determined by the intermittent signal period changing unit 36. The intermittent signal period changing unit 36 is a circuit for changing the period of the intermittent signals according to the judgement result of the packet classification judgement unit 30.

(Mobile Communication Method Using the Mobile Communication System)

Figure 3A:
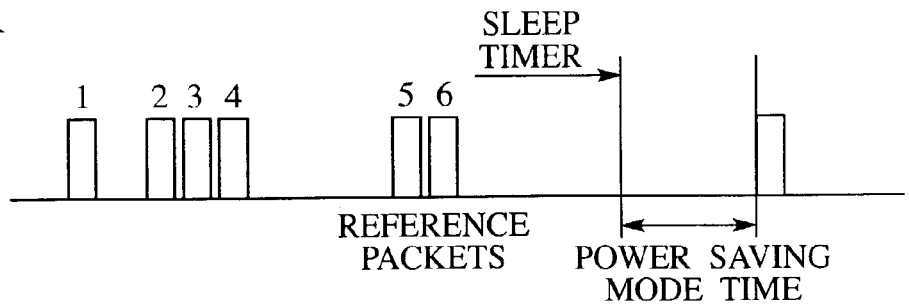
FIGS. 3A and 3B are diagrams showing packets to be transmitted/received in the mobile communication system according to the first embodiment of the present invention.
Figure 3B:
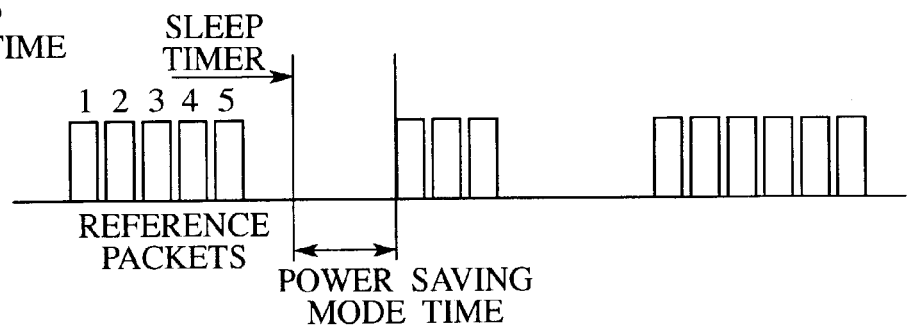

The procedure of the mobile communication method using the mobile communication system in such a configuration will now be described. FIGS. 3A and 3B show packets to be transmitted/received between the radio base station 14 and the mobile terminal 13, where FIG. 3A shows the case of the realtime communication while FIG. 3B shows the case of the non-realtime communication.

As shown in FIG. 3A, in the case of the realtime communication, the sleep timer is activated immediately after the sixth packet is transmitted/received, and then the sleep period (power saving mode) is provided.

At the radio base station 14, it is judged that the radio base station 14 is carrying out the realtime communication according to the identifier described in the packet header of the sixth packet. Then, sleep timer value is determined at the sleep timer setting unit 31 according to this packet type.

At this point, the sleep timer 32a has started the measurement of the elapsed time by detecting that the receiver 27 received the sixth packet, and the sleep permission signal generation unit 33 generates and transmits the sleep permission signal after the sleep timer time determined by the sleep timer setting unit 31 has elapsed.

On the other hand, as shown in FIG. 3B, the case of the non-realtime communication is similar in that if the packet transmitted/received immediately before making a transition to the power saving mode is the fifth packet, the radio base station 14 judges the packet type of the fifth packet, sets the sleep timer value according to this judgement result, activates the sleep timer 32b after transmitting/receiving the fifth packet, and generates and transmits the sleep permission signal after the sleep timer time set for the sleep timer 32b has elapsed.

(Operation of the Mobile Communication System)

Figure 4:
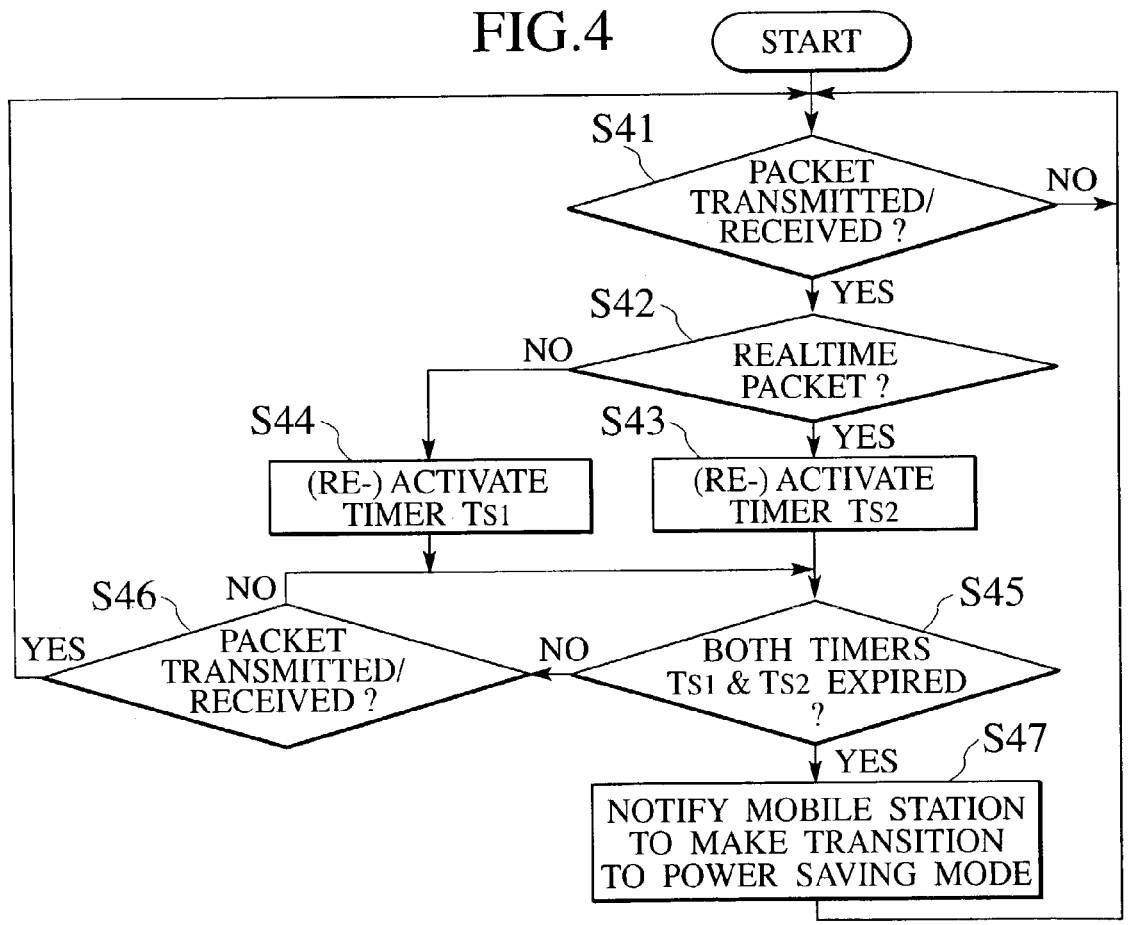
FIG. 4 is a flow chart showing an operation flow until a transition to the power saving mode in the mobile communication system according to the first embodiment of the present invention.

The concrete operation of the mobile communication system for realizing the above described mobile communication method will now be described. FIG. 4 shows the operation flow of the mobile communication system.

First, whether there is a packet transmission/reception with the mobile terminal 13 or not is judged by the packet classification judgement unit 30 of the radio base station 14 (S41). In the case where it is judged that the packet transmission/reception is not carried out at this step S41, a loop processing takes place to make it a waiting state until there is a packet transmission/reception.

Then, in the case where it is judged that the packet transmission/reception is carried out by the radio base station 14 and the mobile terminal 13 at the step S41, the identifier of the header is analyzed to judge whether the packet being transmitted/received is a realtime type or a non-realtime type at the packet classification judgement unit 30 (S42). During this judgement processing by the packet classification judgement unit 30, the sleep timers 32a and 32b detect that the receiver 27 has received a packet, and become an activation waiting state.

In the case where it is judged as a realtime type at this step S42, the packet classification judgement unit 30 sends its judgement result to the sleep timer setting unit 31, and the sleep timer setting unit 31 sets the sleep timer value $T_S$ to be $T_{S2}$ with respect to the sleep permission signal generation unit 33. In response, the sleep permission signal generation unit 33 activates the sleep timer 32a (S43). In response to this activation command, the sleep timer 32a releases the waiting state and starts counting the elapsed time from a timing at which the receiver 27 received the packet.

On the other hand, in the case where the judgement result at the step S42 is a non-realtime type, the sleep timer setting unit 31 sets the sleep timer value $T_S$ to be $T_{S1}$ with respect to the sleep permission signal generation unit 33. In response, the sleep permission signal generation unit 33 activates the sleep timer 32b (S44). In response to this activation command, the sleep timer 32b releases the waiting state and starts counting the elapsed time from a timing at which the receiver 27 received the packet.

Then, the sleep permission signal generation unit 33 acquires the elapsed time measured by the sleep timer 32a or 32b, and judges whether the sleep timer values $T_{S1}$ and $T_{S2}$ set by the sleep timer setting unit 31 are expired or not (S45). In the case where it is judged that the sleep timer value is not expired at this step S45, whether there is a packet transmission/reception between the radio base station 14 and the mobile terminal 13 or not is judged (S46).

In the case where it is judged that there is no transmission/reception at the step S46, the loop processing takes place to repeat the steps S45 and S46 so as to continue the timer operation. On the other hand, in the case where it is judged that there is transmission/reception at the step S46, the sleep timers 32a and 32b are reset and the operation of the steps S41 to S46 described above is repeated.

In the case where it is judged that the sleep timer values $T_{S1}$ and $T_{S2}$ are expired at the step S45, the sleep permission signal generation unit 33 generates the sleep permission signal and transmits the generated sleep permission signal to the mobile terminal 13 through the signal conversion unit 29 and the transmitter 28 (S47). At the mobile terminal 13 side that received this sleep permission signal, the received signal is converted by the signal conversion unit 19, analyzed by the signal analysis unit 20, and the power saving unit 24 is controlled to execute the power saving mode according to the sleep permission signal.

Figure 5A:
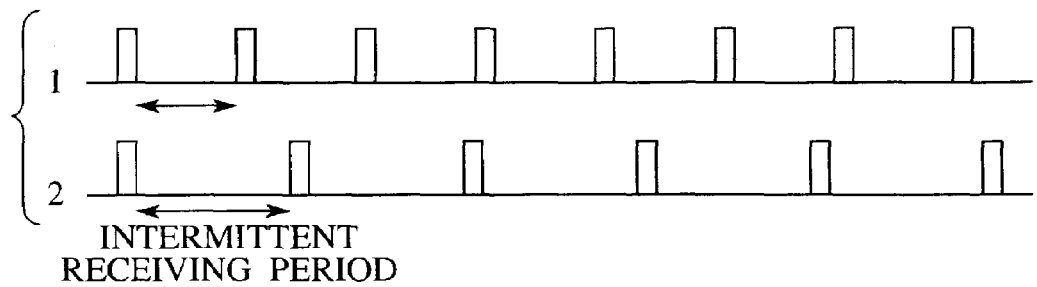
FIGS. 5A and 5B are diagrams showing intermittent signals to be transmitted/received in the mobile communication system according to the first embodiment of the present invention.
Figure 5B:
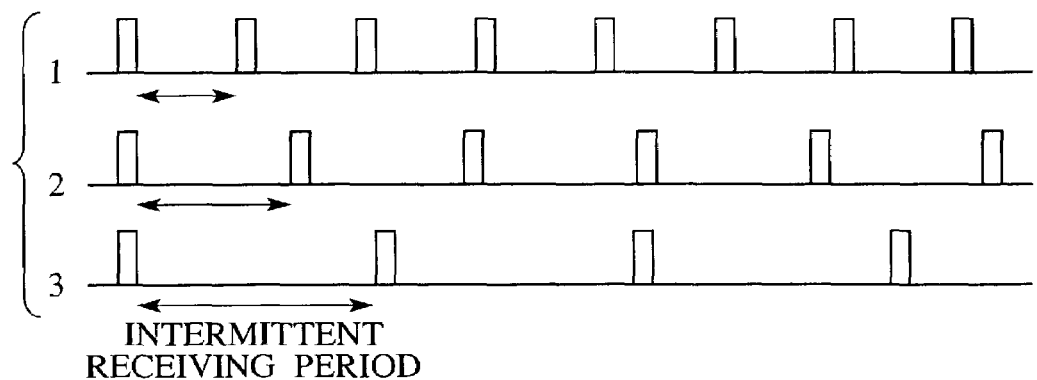

Then, the intermittent receiving in the power saving mode is executed as follows. FIGS. 5A and 5B show the operation of the mobile communication system at a time of making a transition to the power saving mode in this embodiment.

As shown in FIGS. 5A and 5B, a plurality of intermittent receiving periods for the time of the power saving mode are set up, and appropriately selected according to a format of the packet communication. In this embodiment, two types of period 1 and period 2 are set up as the periods in the case of the realtime as shown in FIG. 5A, and three types of period 1, period 2 and period 3 are set up as the periods in the case of the non-realtime. Then, the period is selected such that the intermittent receiving period at a time of the power saving mode takes the maximum value, according to the packet type of the packet transmitted/received between the radio base station 14 and the mobile terminal 13. Note that, in the header of the packet according to this embodiment, an identifier for operating the sleep timer is described for each packet type independently.

In further detail, this period selection is done as follows. The sleep timer is activated independently for each packet according to the packet type, and a transition to the power saving mode having the shortest intermittent receiving period 1 is made first according to the elapsed time since the packet transmission/reception. Then, the intermittent receiving period is made longer sequentially step by step according to the elapsed time to make a transition to the intermittent receiving period that is set as described above. As a result, in this embodiment, the maximum value of the intermittent receiving period at a time of the power saving mode becomes the second longest period in the case of the realtime type, and the longest intermittent receiving period in the case of the non-realtime type.

Figure 6:
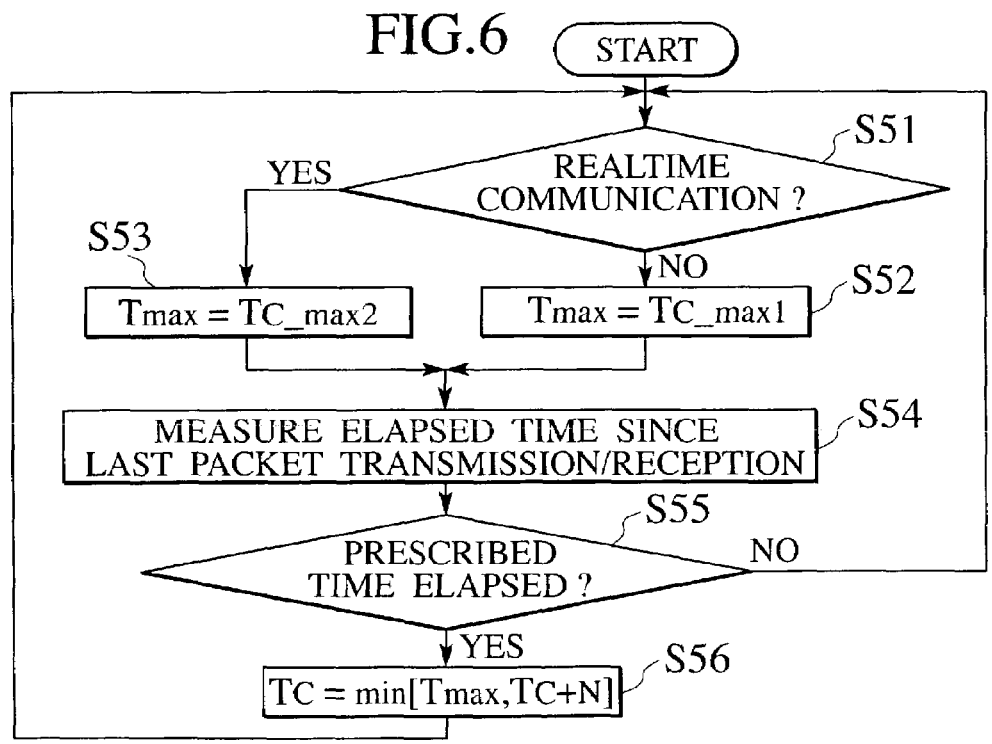
FIG. 6 is a flow chart showing an operation flow during the power saving- mode in the mobile communication system according to the first embodiment of the present invention.

FIG. 6 shows the operation flow of the mobile communication system at a time of the power saving mode in this embodiment.

As shown in FIG. 6, when the packet transmission/reception is carried out by the radio base station 14 and the mobile terminal 13, the packet classification judgement unit 30 judges the priority level of the packet being transmitted/received and the packet type indicating whether this packet is a realtime type or a non-realtime type, etc (S51).

In the case where the packet is a realtime type at the step S51, the intermittent signal period changing unit 36 makes the intermittent receiving period sequentially longer within a range of not exceeding a prescribed threshold, whereas in the case where the packet is a non-realtime type at the step S51, the intermittent signal period changing unit 36 makes the intermittent receiving period sequentially longer from a prescribed standard value.

More specifically, in the case where the packet is judged as a non-realtime type at the step S51, the intermittent signal period changing unit 36 sets the maximum value $T_C$ of the intermittent receiving period at a time of the power saving mode to be $T_{C\_max1}$ (S52). Also, in the case where the packet is judged as a realtime type at the step S51, the intermittent signal period changing unit 36 sets the maximum value $T_C$ of the intermittent receiving period at a time of the power saving mode to be a standard value $T_{C\_max2}$ (S53). Note that, in this embodiment, $T_{C\_max1}$ and $T_{C\_max2}$ are defined such that $T_{C\_max1} < T_{C\_max2}$.

Then, the sleep permission signal generation unit 33 activates the sleep timer 32a or 32b to start the measurement of the elapsed time since a time of transmission/reception of the immediately previous packet (S54). The sleep permission signal generation unit 33 judges whether a prescribed time has elapsed or not (S55), and in the case where it is judged that the prescribed time has not elapsed, the processing of the steps S51 to S55 described above is repeated.

In the case where the sleep permission signal generation unit 33 judged that the elapsed time exceeded the prescribed value and the packet transmission/reception is not carried out, one step longer intermittent receiving period $T_{C+N}$ and the maximum value $T_{max}$ of the intermittent receiving period that has been set are compared, and one with the shorter intermittent receiving period is selected as a new maximum value $T_C$ of the intermittent receiving period (S56). The steps S51 to S56 described above are repeated until the intermittent receiving period becomes maximum within a range of not exceeding the threshold. As a result, the intermittent receiving period is made longer as the period with no packet transmission/reception becomes longer.

Second Embodiment

Figure 7:
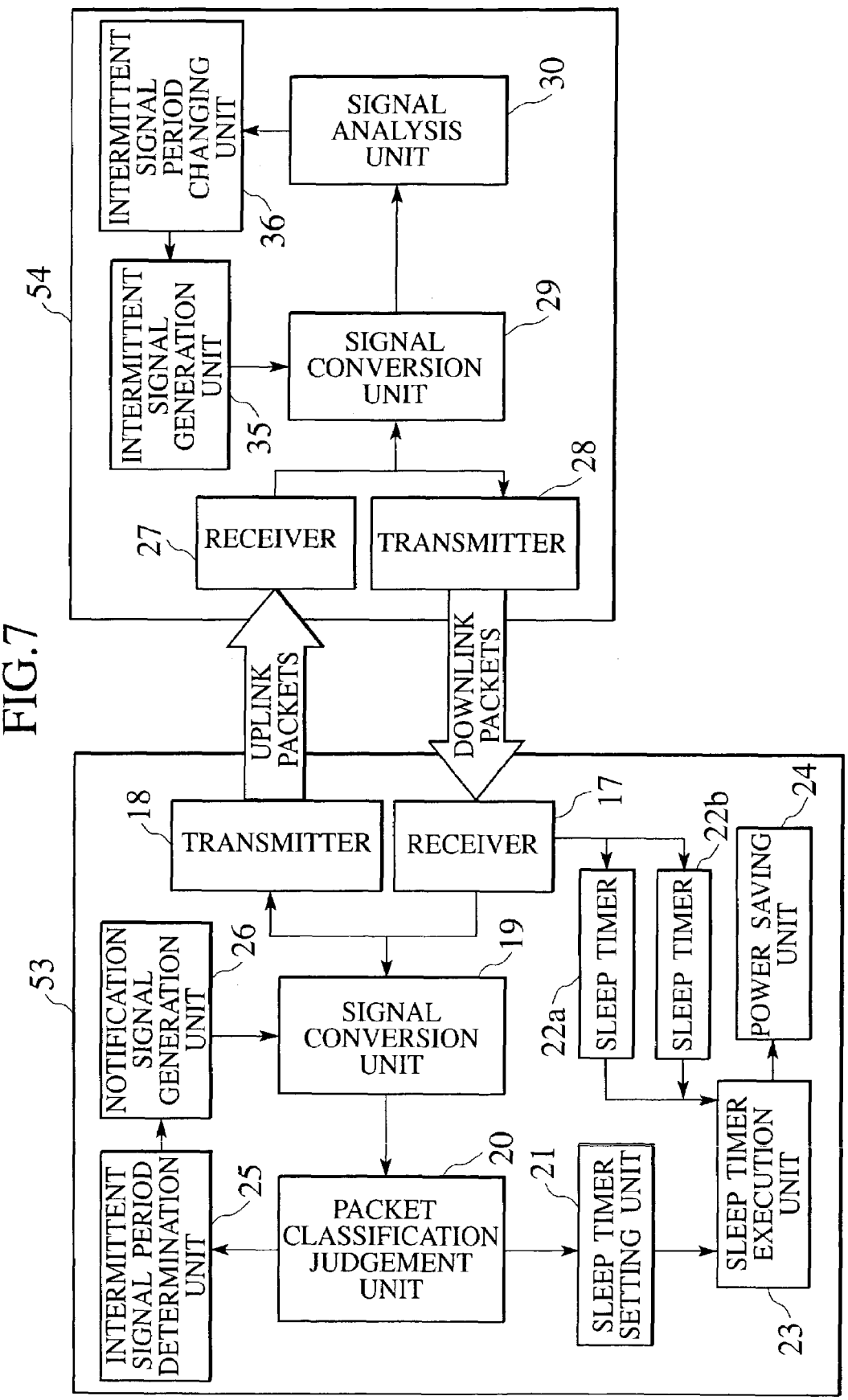
FIG. 7 is a block diagram showing an internal configuration of a mobile terminal and a radio base station in the mobile communication system according to the second embodiment of the present invention.
Figure 8:
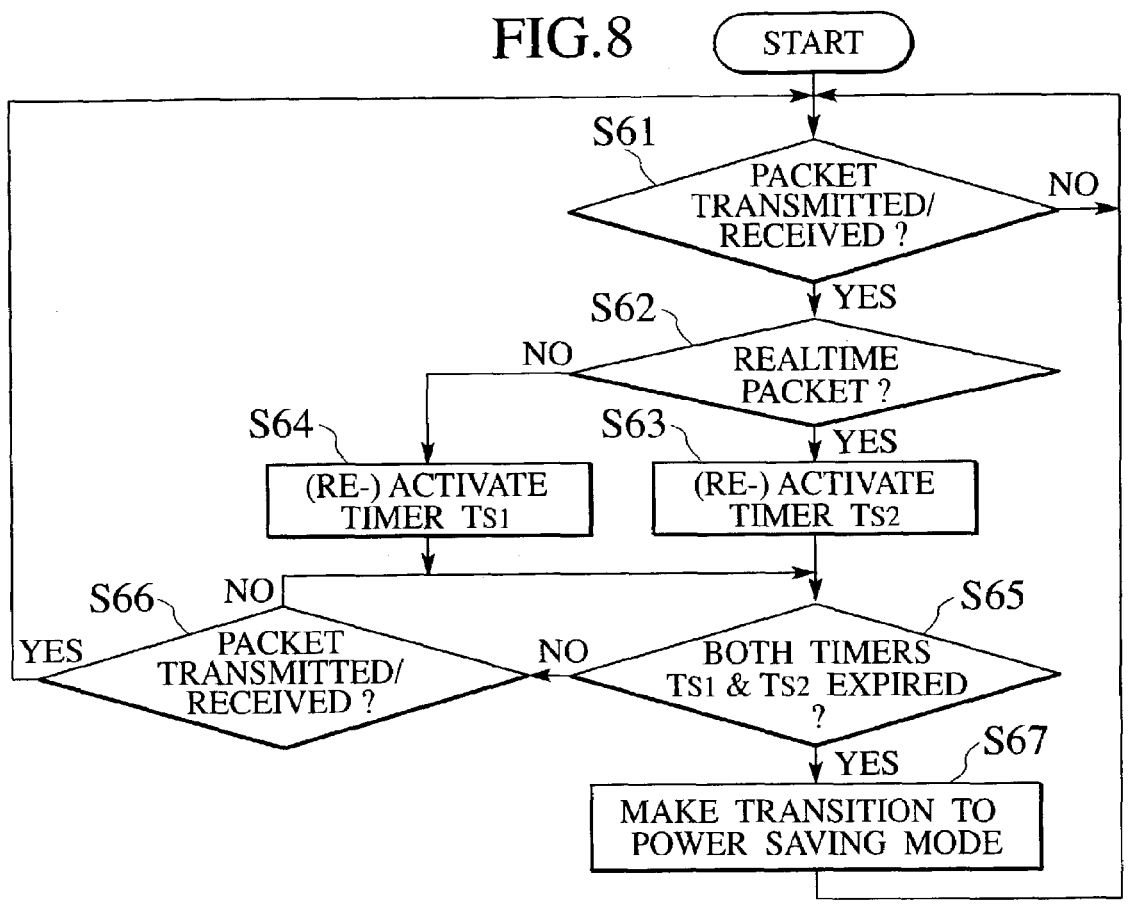
FIG. 8 is a flow chart showing an operation flow until a transition to the power saving mode in the mobile communication system according to the second embodiment of the present invention.
Figure 9:
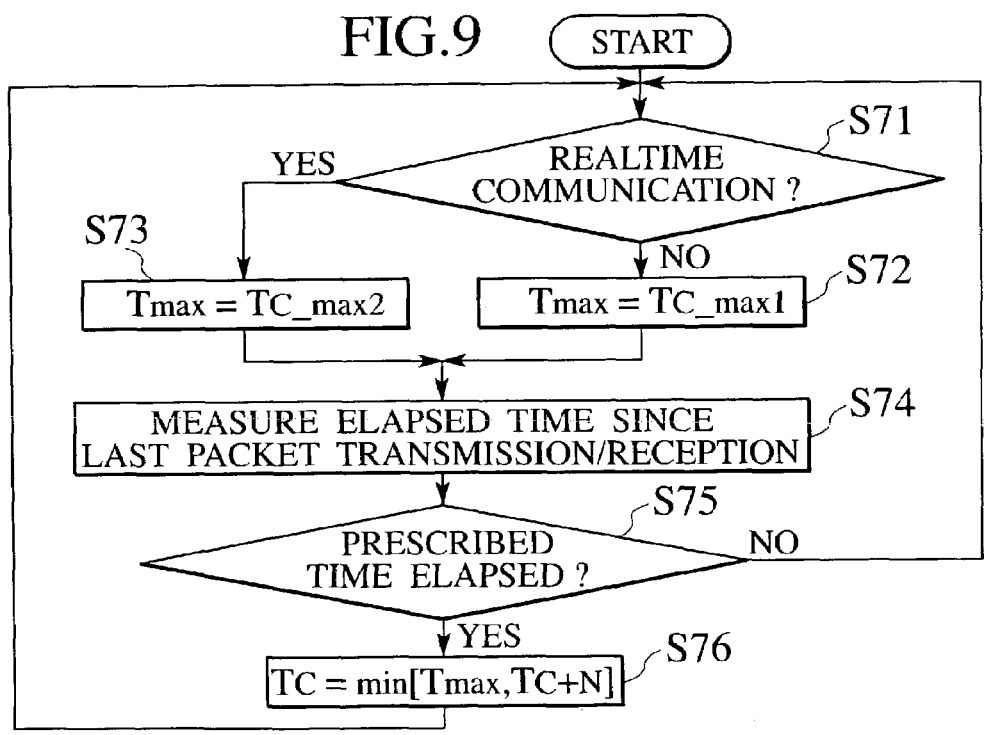
FIG. 9 is a flow chart showing an operation flow during the power saving mode in the mobile communication system according to the second embodiment of the present invention.

Referring now to FIG. 7 to FIG. 9, the second embodiment of a mobile communication system according to the present invention will be described in detail.

This embodiment is characterized in that the packet classification judgement unit, the sleep timer setting unit, and the intermittent signal period changing unit as described above are provided on the mobile terminal side. FIG. 7 shows an internal configuration of the mobile terminal 53 according to this embodiment.

Namely, as shown in FIG. 7, the mobile terminal 53 has a transmitter 18, a receiver 17, a signal conversion unit 19, a packet classification judgement unit 20, a sleep timer setting unit 21, sleep timers 22a and 22b, a sleep timer execution unit 23, a power saving unit 24, an intermittent signal period determination unit 25, and a notification signal generation unit 26.

The transmitter 18 and the receiver 17 carry out transmission/reception of packet data and control signals with respect to the radio base station 54, and the signals to be transmitted/received are converted by the signal conversion unit 19.

The packet classification judgement unit 20 is a circuit for judging a priority level of the packet entered from the signal conversion unit 19 and a packet type that indicates whether this packet is of a realtime format or of a non-realtime format, etc. More specifically, the judgement is made according to an identifier described in a packet header. This judgement result is sent to the intermittent signal period determination unit 25 and the sleep timer setting unit 21.

The sleep timer setting unit 21 is a circuit for setting the sleep timer value according to the judgement result by the packet classification judgement unit 20. More specifically, the sleep timer setting unit 21 receives the judgement result from the packet classification judgement unit 20, and according to the priority level of the packet or the packet type that indicates whether it is the realtime communication or the non-realtime communication, etc., the sleep timer setting unit 21 inputs a value selected from a plurality of sleep timer values stored in an internal memory into the sleep timer execution unit 23.

The sleep timers 22a and 22b are timers for measuring an elapsed time since the packet is transmitted/received, where the receiver 17 that detected the receiving of the packet activates the timer and the elapsed time is inputted into the sleep timer execution unit 23.

Note that, while measuring the elapsed time, when another packet of a type different from the type of the packet related to the measurement is received, another one of the sleep timers 22a and 22b is activated in order to carry out the measurement for the packet of a different type. More specifically, the sleep timer 22a is activated when the packet of the realtime communication is received, whereas the sleep timer 22b is activated when the packet of the non-realtime communication is received.

The sleep timer execution unit 23 activates the sleep timer 22 after the packet is transmitted/received, and controls the power saving unit 24 to execute the power saving mode at a timing where the measured time by the sleep timer 22 exceeds the sleep timer value. Note that, when a plurality of the sleep timers are being activated, the sleep timer execution unit 23 controls the power saving unit 24 to execute the power saving mode after all the sleep timers are expired.

The intermittent signal period determination unit 25 determines the intermittent signal period according to the judgement result by the packet classification judgement unit 20, and outputs the determined period to the notification signal generation unit 26. Also, the intermittent signal period determination unit 25 controls the receiver 17 according to the determined period, so as to carry out the intermittent receiving by the receiver 17.

The notification signal generation unit 26 is a circuit for transmitting a notification signal for notifying the intermittent signal period determined by the intermittent signal period determination unit 25 to the radio base station 54 during the power saving mode. The notification signal generated by the notification signal generation unit 26 is transmitted to the radio base station 54 through the signal conversion unit 19 and the transmitter 18. The content of the transmitted notification signal is analyzed by the signal analysis unit 30 at the radio base station 54, and its analysis result is inputted into the intermittent signal period changing unit 36. The intermittent signal period changing unit 36 changes the intermittent signal period according to the content of the notification signal, and the intermittent signal generation unit 35 generates the intermittent signals according to the changed period.

(Mobile Communication Method Using the Mobile Communication System)

The procedure of the mobile communication method using the mobile communication system in such a configuration will now be described. FIG. 8 shows the operation flow of the mobile communication system.

First, whether there is a packet transmission/reception with the radio base station 54 or not is judged by the packet classification judgement unit 20 of the mobile terminal 53 (S61). In the case where it is judged that the packet transmission/reception is not carried out at this step S61, a loop processing takes place to make it a waiting state until there is a packet transmission/reception.

Then, in the case where it is judged that the packet transmission/reception is carried out by the radio base station 54 and the mobile terminal 53 at the step S61, the identifier of the header is analyzed to judge a type of the packet being transmitted/received at the packet classification judgement unit 20 (S62). During this judgement processing by the packet classification judgement unit 20, the sleep timers 22a and 22b detect that the receiver 17 has received a packet, and become an activation waiting state.

In the case where it is judged as a realtime type at this step S62, the packet classification judgement unit 20 sends its judgement result to the sleep timer setting unit 21, and the sleep timer setting unit 21 sets the sleep timer value $T_S$ to be $T_{S2}$ with respect to the sleep timer execution unit 23. In response, the sleep timer execution unit 23 activates the sleep timer 22a (S63). In response to this activation command, the sleep timer 22a releases the waiting state and starts counting the elapsed time from a timing at which the receiver 17 received the packet.

On the other hand, in the case where the judgement result at the step S62 is a non-realtime type, the sleep timer setting unit 21 sets the sleep timer value $T_S$ to be $T_{S1}$ with respect to the sleep timer execution unit 23. In response, the sleep timer execution unit 23 activates the sleep timer 22b (S64). In response to this activation command, the sleep timer 22b releases the waiting state and starts counting the elapsed time from a timing at which the receiver 17 received the packet.

Then, the sleep timer execution unit 23 acquires the elapsed time measured by the sleep timer 22a or 22b, and judges whether the sleep timer values $T_{S1}$ and $T_{S2}$ set by the sleep timer setting unit 21 are expired or not (S65). In the case where it is judged that the sleep timer value is not expired at this step S65, whether there is a packet transmission/reception between the radio base station 54 and the mobile terminal 53 or not is judged (S66). In the case where it is judged that there is no transmission/reception at the step S66, the loop processing takes place to repeat the steps S65 and S66 so as to continue the timer operation. On the other hand, in the case where it is judged that there is transmission/reception at the step S66, the sleep timers 22a and 22b are reset and the operation of the steps S61 to S66 described above is repeated.

In the case where it is judged that the sleep timer values $T_{S1}$ and $T_{S2}$ are expired at the step S65, the sleep timer execution unit 23 controls the power saving unit 24 to execute the power saving mode (S67).

Then, the intermittent receiving in the power saving mode is executed as follows. FIG. 9 shows the operation flow of the mobile communication system at a time of the power saving mode in this embodiment.

As shown in FIG. 9, when the packet transmission/reception is carried out by the radio base station 54 and the mobile terminal 53, the packet classification judgement unit 20 judges a type of the packet being transmitted/received (S71).

In the case where the packet is judged as a non-realtime type at the step S71, the intermittent signal period determination unit 25 sets the maximum value $T_C$ of the intermittent receiving period at a time of the power saving mode to be $T_{C\_max1}$ (S72). Also, in the case where the packet is judged as a realtime type at the step S71, the intermittent signal period determination unit 25 sets the maximum value $T_C$ of the intermittent receiving period at a time of the power saving mode to be a standard value $T_{C\_max2}$ (S73). Note that, in this embodiment, $T_{C\_max1}$ and $T_{C\_max2}$ are defined such that $T_{C\_max1} < T_{C\_max2}$.

Then, the intermittent signal period determination unit 25 sends the determined intermittent signal period to the notification signal generation unit 26, and the notification signal generation unit 26 generates the notification signal for notifying the determined intermittent signal period, and transmits it to the radio base station 54 through the signal conversion unit 19 and the transmitter 18. At the radio base station 54 that received this notification signal, the content of the notification signal is analyzed by the signal analysis unit 30, and its analysis result is outputted to the intermittent signal period changing unit 36. The intermittent signal period changing unit 36 changes the intermittent signal period according to the content of the notification signal, and the intermittent signal generation unit 35 generates the intermittent signals according to the changed period.

Then, the sleep timer execution unit 23 activates the sleep timer 22a or 22b to start the measurement of the elapsed time since a time of transmission/reception of the immediately previous packet (S74). The sleep timer execution unit 23 judges whether a prescribed time has elapsed or not (S75), and in the case where it is judged that the prescribed time has not elapsed, the processing of the steps S71 to S75 described above is repeated.

In the case where the sleep timer execution unit 23 judged that the elapsed time exceeded the prescribed value and the packet transmission/reception is not carried out, one step longer intermittent receiving period $T_{C+N}$ and the maximum value $T_{max}$ of the intermittent receiving period that has been set are compared, and one with the shorter intermittent receiving period is selected as a new maximum value $T_C$ of the intermittent receiving period (S76). The steps S71 to S76 described above are repeated until the intermittent receiving period becomes maximum within a range of not exceeding the threshold. As a result, the intermittent receiving period is made longer as the period with no packet transmission/reception becomes longer.

As described above, according to the present invention, it is possible to realize an effective power saving mode while reducing a response delay by adjusting an intermittent receiving period during the power saving mode and a timing for making a transition to the power saving mode according to a packet communication format in the mobile communication system.

According to the present invention, a timing for making a transition to the power saving mode in the packet communication system is set according to the communication format by which the last communication was carried out such that, when the packet communication format is the realtime communication, the timing for making a transition to the power saving mode can be delayed by using a larger sleep timer value, and the influence due to the paging delay can be made smaller by reducing the number of transitions to the sleep, for example. Also, in the case where the packet communication format is the non-realtime communication, the paging delay is tolerable so that the timing for a transition to the power saving mode can be made earlier by using a small sleep timer value, and the effective power saving can be realized.

Also, the intermittent receiving period can be set according to the packet communication format by which the last communication was carried out from a plurality of intermittent receiving period at a time of the power saving mode such that, when the packet communication format is the realtime communication, the paging delay can be suppressed low by setting the intermittent receiving period at a time of the power saving mode to be not longer than a prescribed threshold, for example. Also, in the case where the packet communication format is the non-realtime communication, the effective power saving can be realized by setting the intermittent receiving period at a time of the power saving mode to be maximally long up to a level of not adversely influencing the system.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile communication system for carrying out packet transmission/reception between a mobile terminal and a radio base station, comprising:
   a power saving unit for executing a power saving mode to reduce a power consumption at the mobile terminal;
   a packet classification judgement unit for judging a packet type of a packet;
   a sleep timer setting unit for setting a sleep timer value indicating a time duration since a last packet is transmitted/received until the power saving mode starts, according to a judgement result of the packet classification judgement unit;
   at least one sleep timer for measuring an elapsed time since the packet is transmitted/received; and
   a sleep execution unit for activating the sleep timer after the packet is transmitted/received, and controlling the power saving unit to execute the power saving mode at a timing at which the elapsed time measured by the at least one sleep timer exceeded the sleep timer value, wherein
   the at least one sleep timer includes a plurality of sleep timers such that when another packet of the packet type different from that of the packet is received during a measurement of the elapsed time for the packet, another sleep timer is activated to carry out a measurement of the elapsed time for the another packet; and
   the sleep execution unit controls the power saving unit to execute the power saving mode when all sleep timers are expired.

2. The mobile communication system of claim 1, further comprising:
   an intermittent receiving unit for executing an intermittent receiving for receiving control signals periodically at the mobile terminal during the power saving mode; and
   a period changing unit for changing a period of the intermittent receiving according to the judgement result of the packet classification judgement unit.

3. The mobile communication system of claim 2, wherein the period changing unit makes the period of the intermittent receiving longer as a period without no packet transmission/reception becomes longer.

4. The mobile communication system of claim 3, wherein the packet classification judgement unit judges the packet type as either a realtime type or a non-realtime type; and
   the period changing unit makes the period of the intermittent receiving sequentially longer within a range of not exceeding a prescribed threshold when the packet type is the realtime type, and makes the period of the intermittent receiving sequentially longer from a prescribed standard value when the packet type is the non-realtime type.

5. A mobile communication method for carrying out packet transmission/reception between a mobile terminal having a power saving mode to reduce a power consumption and a radio base station, comprising the steps of:
   (a) judging a packet type of a packet;
   (b) setting a sleep timer value indicating a time duration since a last packet is transmitted/received until the power saving mode starts, according to a judgement result of the step (a);
   (c) activating at least one sleep timer for measuring an elapsed time since the packet is transmitted/received; and
   (d) controlling the mobile terminal to execute the power saving mode at a timing at which the elapsed time measured by the at least one sleep timer exceeded the sleep timer value, wherein
   the at least one sleep timer includes a plurality of sleep timers such that when another packet of the packet type different from that of the packet is received during a measurement of the elapsed time for the packet, the step (c) activates another sleep timer to carry out a measurement of the elapsed time for the another packet, and
   the step (d) controls the mobile terminal to execute the power saving mode when all sleep timers are expired.

6. The mobile communication method of claim 5, further comprising the steps of:
- (e) executing an intermittent receiving for receiving control signals periodically at the mobile terminal during the power saving mode; and
- (f) changing a period of the intermittent receiving according to the judgement result of the step (a).

7. The mobile communication method of claim 6, wherein the step (f) makes the period of the intermittent receiving longer as a period without no packet transmission/reception becomes longer.

8. The mobile communication method of claim 7, wherein the step (a) judges the packet type as either a realtime type or a non-realtime type; and the step (f) makes the period of the intermittent receiving sequentially longer within a range of not exceeding a prescribed threshold when the packet type is the realtime type, and makes the period of the intermittent receiving sequentially longer from a prescribed standard value when the packet type is the non-realtime type.

9. A mobile terminal device for carrying out packet transmission/reception with a radio base station, comprising:
- a power saving unit for executing a power saving mode to reduce a power consumption at the mobile terminal device;
- a packet classification judgement unit for judging a packet type of a packet;
- a sleep timer setting unit for setting a sleep timer value indicating a time duration since a last packet is transmitted/received until the power saving mode starts, according to a judgement result of the packet classification judgement unit;
- at least one sleep timer for measuring an elapsed time since the packet is transmitted/received; and
- a sleep execution unit for activating the sleep timer after the packet is transmitted/received, and controlling the power saving unit to execute the power saving mode at a timing at which the elapsed time measured by the at least one sleep timer exceeded the sleep timer value, wherein the at least one sleep timer includes a plurality of sleep timers such that when another packet of the packet type different from that of the packet is received during a measurement of the elapsed time for the packet, another sleep timer is activated to carry out a measurement of the elapsed time for the another packet, and the sleep execution unit controls the power saving unit to execute the power saving mode when all sleep timers are expired.

10. The mobile terminal device of claim 9, further comprising:
- an intermittent receiving unit for executing an intermittent receiving for receiving control signals periodically at the mobile terminal device during the power saving mode; and
- a period changing unit for changing a period of the intermittent receiving according to the judgement result of the packet classification judgement unit.

11. The mobile terminal device of claim 10, wherein the period changing unit makes the period of the intermittent receiving longer as a period without no packet transmission/reception becomes longer.

12. The mobile terminal device of claim 11, wherein the packet classification judgement unit judges the packet type as either a realtime type or a non-realtime type; and the period changing unit makes the period of the intermittent receiving sequentially longer within a range of not exceeding a prescribed threshold when the packet type is the realtime type, and makes the period of the intermittent receiving sequentially longer from a prescribed standard value when the packet type is the non-realtime type.

13. A radio base station device for carrying out packet transmission/reception with a mobile terminal having a power saving mode to reduce a power consumption, comprising:
- a packet classification judgement unit for judging a packet type of a packet;
- a sleep timer setting unit for setting a sleep timer value indicating a time duration since a last packet is transmitted/received until the power saving mode starts, according to a judgement result of the packet classification judgement unit;
- at least one sleep timer for measuring an elapsed time since the packet is transmitted/received; and
- a sleep permission signal transmission unit for activating the sleep timer after the packet is transmitted/received, and transmitting a sleep permission signal for controlling the mobile terminal to execute the power saving mode at a timing at which the elapsed time measured by the at least one sleep timer exceeded the sleep timer value, wherein the at least one sleep timer includes a plurality of sleep timers such that when another packet of the packet type different from that of the packet is received during a measurement of the elapsed time for the packet, another sleep timer is activated to carry out a measurement of the elapsed time for the another packet, and the sleep permission signal transmission unit transmits the sleep permission signal when all sleep timers are expired.

14. The radio base station device of claim 13, further comprising:
- an intermittent signal transmission unit for transmitting intermittent signals to the mobile terminal such that the mobile terminal executes an intermittent receiving for receiving the intermittent signals periodically during the power saving mode; and
- a period changing unit for changing a period of the intermittent signals according to the judgement result of the packet classification judgement unit.

15. The radio base station device of claim 14, wherein the period changing unit makes the period of the intermittent receiving longer as a period without no packet transmission/reception becomes longer.

16. The radio base station device of claim 15, wherein the packet classification judgement unit judges the packet type as either a realtime type or a non-realtime type; and the period changing unit makes the period of the intermittent receiving sequentially longer within a range of not exceeding a prescribed threshold when the packet type is the realtime type, and makes the period of the intermittent receiving sequentially longer from a prescribed standard value when the packet type is the non-realtime type.

* * * * *